(12) United States Patent
Lim

(10) Patent No.: US 7,233,807 B2
(45) Date of Patent: Jun. 19, 2007

(54) DEVICE AND METHOD FOR DISPLAYING DATA IN MOBILE TERMINAL EQUIPPED WITH CAMERA

(75) Inventor: Chae-Whan Lim, Taegukwangyok-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 542 days.

(21) Appl. No.: 10/465,571

(22) Filed: Jun. 20, 2003

(65) Prior Publication Data

US 2003/0236105 A1 Dec. 25, 2003

(30) Foreign Application Priority Data

Jun. 21, 2002 (KR) .................. 10-2002-0035042
Sep. 17, 2002 (KR) .................. 10-2002-0056642

(51) Int. Cl.
*H04M 1/00* (2006.01)

(52) U.S. Cl. ............... 455/556.1; 455/145; 455/154.2; 455/158.5; 455/323; 455/324; 455/566; 455/575.1; 715/700; 345/211; 345/212; 345/1.3; 345/11; 345/3.1; 348/14.07; 348/33.02; 348/376; 348/552

(58) Field of Classification Search ............ 455/556.1, 455/566, 575, 323, 324, 502, 145, 154.2, 455/158.4, 158.5, 208, 265, 575.1; 345/211, 345/213, 1.1, 1.3, 3.1, 3.2, 11, 212; 348/14.07, 348/376, 33.02, 552; 715/700
See application file for complete search history.

(56) References Cited

U.S. PATENT DOCUMENTS 5,793,367 A * 8/1998 Taguchi ............... 715/756
6,308,084 B1 * 10/2001 Lonka .................. 455/556.1
6,373,516 B1 * 4/2002 Kim .................... 348/14.01
6,396,924 B1 5/2002 Suso et al.
6,775,560 B2 * 8/2004 King et al. ............ 455/566
2003/0162569 A1 * 8/2003 Arakawa et al. ........ 455/566

FOREIGN PATENT DOCUMENTS

DE 41 03 539 8/1992
DE 199 61 067 6/2000
DE 199 62 922 6/2000

OTHER PUBLICATIONS

Kishino Fumio, et al., "Multipoint Video Teleconferencing System Using Field/Frame Time Division Multiplexing Technique", Proceedings of The International Teleconference Symposium, International Telecommunications Satellite Organization, 1984, p. 37-44, Database Compendex, Online Engineering Information, Inc., NY, NY.

* cited by examiner

*Primary Examiner*—Matthew Anderson
*Assistant Examiner*—Shaima Q. Aminzay
(74) *Attorney, Agent, or Firm*—Roylance, Abrams, Berdo & Goodman, L.L.P.

(57) ABSTRACT

A device and method for displaying image data and user interface (UI) data in a mobile terminal. A camera outputs captured image data to be displayed and a synchronous signal. The mobile terminal generates UI data. In response to the synchronous signal from the camera, a selector divides a frame data time into a first time and a second time. The selector selects and outputs the image data in the first time. The selector selects and outputs the UI data in the second time. A display unit displays the image data and UI data output from the selector on corresponding display areas.

16 Claims, 12 Drawing Sheets

DEVICE AND METHOD FOR DISPLAYING DATA IN MOBILE TERMINAL EQUIPPED WITH CAMERA

PRIORITY

This application claims priority to an application entitled "DEVICE AND METHOD FOR DISPLAYING DATA IN MOBILE TERMINAL EQUIPPED WITH CAMERA", filed in the Korean Industrial Property Office on Jun. 21, 2002 and Sep. 17, 2002 and assigned Serial Nos. 2002-35042 and 2002-56642, respectively, the contents of which are hereby incorporated by reference.

BACKGROUND OF THE INVENTION

1. Field of the Invention

The present invention relates to a device and method for processing data in a mobile terminal equipped with a camera, and more particularly to a device and method for displaying image data and user interface (UI) data in a mobile terminal.

2. Description of the Related Art

Mobile terminals have recently developed into structures capable of transmitting high-speed data as well as voice communications. Mobile communication networks based on the international mobile telecommunication-2000 (IMT-2000) standard can implement high-speed data communication as well as voice communication using the mobile terminal. Data capable of being processed in the mobile terminal for performing the data communication can be packet data and image data.

Conventionally, an image processing device includes a camera for capturing an image and a display unit for displaying the image captured by the camera. The camera can use a charge coupled device (CCD) image sensor or a complementary metal oxide semiconductor (CMOS) image sensor. As camera devices have become smaller, image capturing devices are further miniaturized. Mobile terminals equipped with camera devices are becoming increasingly popular. A mobile terminal can capture images, and display moving and still pictures. Mobile terminals can also transmit the captured images to a base station.

The mobile terminal equipped with the camera must be able to display user interface (UI) data such as the sensitivity of an RF signal received from a base station, an indicator indicating a remaining amount of battery power, icons or characters for a user interface, etc., and image data captured by the camera or picture or pixel data received from the base station.

FIG. 1 is a view illustrating a method for displaying image data and user interface (UI) data in a mobile terminal equipped with a camera. As shown in FIG. 1, a display unit 30 includes the first display area 31 for displaying image data captured by the camera 20, the second display area 33 for displaying an operating state of the mobile terminal 10, the third display area 35 for displaying a menu for controlling the image data displayed on the first display area 31, and so on. The image data displayed on the first display area 31 is the image data captured by the camera 20. The items of the UI data displayed on the second and third display areas 33 and 35 are data generated in the mobile terminal 10. The UI data items displayed on the second display area 33 indicate the mobile terminal's reception sensitivity, a remaining amount of battery power, current time data, among other items of interest. The UI data displayed on the third display area 35 can be menu information to be used for selecting a command needed for controlling (e.g., scrolling or zooming) an image or picture currently displayed.

The mobile terminal 10 must be able to appropriately control the image data captured by the camera 20 and UI data generated in the mobile terminal 10 when the image data and UI data are sent to, and displayed on, the display unit 30, as shown in FIG. 1. The mobile terminal 10 must be able to independently control display paths associated with the image data captured by the camera 20 and the UI data for the user interface.

SUMMARY OF THE INVENTION

Therefore, it is one object of the present invention to provide a device and method for sending data to be displayed on a display unit provided in a mobile terminal equipped with a camera.

It is another object of the present invention to provide a device and method for enabling the mobile terminal equipped with a camera to carry out a time division multiplexing operation for image data output from the camera and user interface (UI) and data generated in the mobile terminal in a frame time and to send the image data and UI data to a display unit on the basis of the time division multiplexing operation.

It is yet another object of the present invention to provide a device and method for enabling a mobile terminal equipped with a camera to send image data from the camera to a display unit in a first time when a vertical synchronous signal is generated, and enabling the mobile terminal to send user interface (UI) data from the mobile terminal to the display unit in a second time when a different vertical synchronous signal is generated.

In accordance with an embodiment of the present invention, the above and other objects can be accomplished by the provision of a device for displaying data in a mobile terminal, comprising: a camera for outputting captured image data to be displayed and a synchronous signal; the mobile terminal for generating user interface (UI) data; a selector responsive to the synchronous signal from the camera for dividing a frame data time into a first time and a second time, selecting and outputting the image data in the first time, and selecting and outputting the UI data in the second time; and a display unit for displaying the image data and UI data output from the selector on corresponding display areas.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
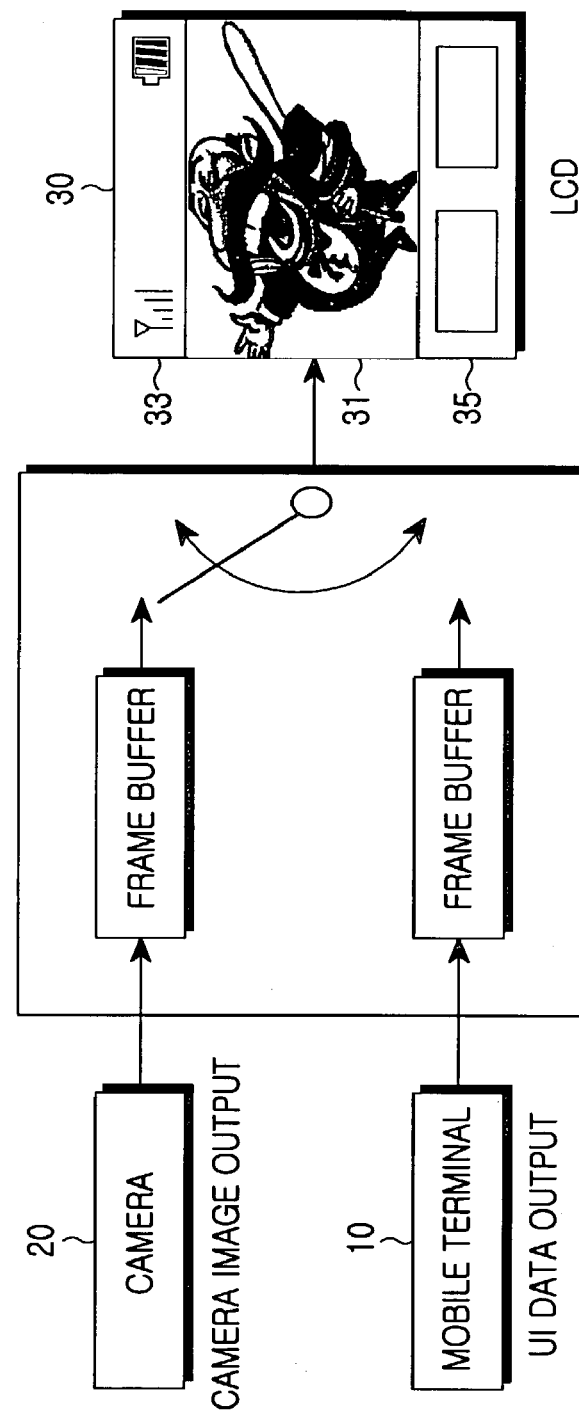
FIG. 1 is a view illustrating the configuration of a conventional device for sending display data in a mobile terminal equipped with a camera.

Now, preferred embodiments of the present invention will be described in detail with reference to the annexed drawings. In the drawings, the same or similar elements are denoted by the same reference numerals even though they are depicted in different drawings.

Those skilled in the art can appreciate that specific things such as a transmission rate of an image signal, the number of pixels of image signals captured by the camera, a size of a picture displayed on a display unit, and related matters, are described only for illustrative purposes to aid in the understanding of the various embodiments of the present invention, and these embodiments of the present invention can be also implemented without the specific things.

The term "image capture mode" means an operating mode for capturing image signals through a camera and displaying data of the image signals on a display unit. The term "path control mode" means an operating mode for controlling a path of data transmitted to the display unit. The term "first path control signal" means a signal for activating a path for transferring the image signals captured by the camera to the display unit, and the term "second path control signal" means a signal for activating a path for enabling the controller to access the display unit.

It is assumed that a device for capturing and displaying an image is a mobile terminal in accordance with embodiments of the present invention. However, the device and method in accordance with the embodiments of the present invention can be applied for any mobile communication terminal capable of displaying an image using a camera other than the mobile terminal.

Figure 2:
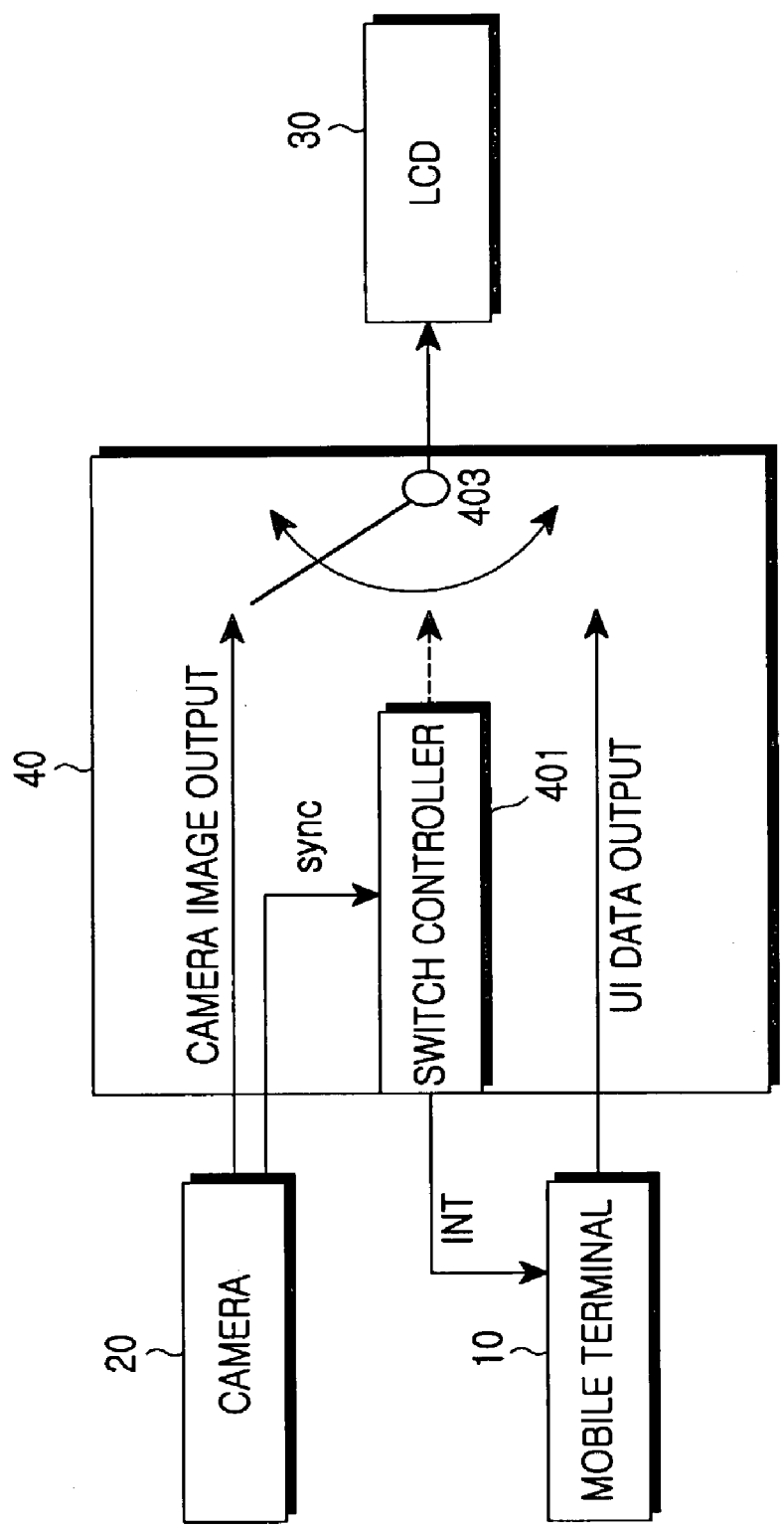
FIG. 2 is a view illustrating the configuration of a device for sending display data in a mobile terminal equipped with a camera in accordance with a first embodiment of the present invention.

FIG. 2 is a view illustrating the configuration of a device for sending display data in a mobile terminal 10 equipped with a camera 20 in accordance with the first embodiment of the present invention.

Referring to FIG. 2, image data captured by the camera 20 and user interface (UI) data generated in the mobile terminal 10 are applied to a selector 40, respectively. The selector 40 includes a switch controller 401 and switch 403 as shown in FIG. 2. The image data and UI data are output, to a display unit 30, in different time periods on the basis of a time division-based switching operation.

Operation of the selector 40 will now be described. First, the image data captured by the camera 20 is applied to the switch 403 as is the UI data generated in the mobile terminal 10. The switch controller 401 controls the switch 403 in response to a synchronous signal output from the camera 20. The switch controller 401 enables the switch 403 to send, to the display unit 30, the image data captured by the camera 20 or the UI data generated in the mobile terminal 10.

After capturing image data, the camera 20 sends the captured image data to the display unit 30. At this time, the camera 20 generates the synchronous signal along with the captured image data. The synchronous signal includes a horizontal synchronous signal and vertical synchronous signal. The horizontal synchronous signal is generated in units of lines of a display picture. The vertical synchronous signal is generated when image data of one frame is completed. In the embodiments of the present invention, it is assumed that the switch controller 401 receives the vertical synchronous signal Vsync. Thus, the switch controller 401 performs a control operation in units of frames so that the switch 403 switches the image data output from the camera 20 and the UI data generated in the mobile terminal 10 to the display unit 30.

Figure 3:
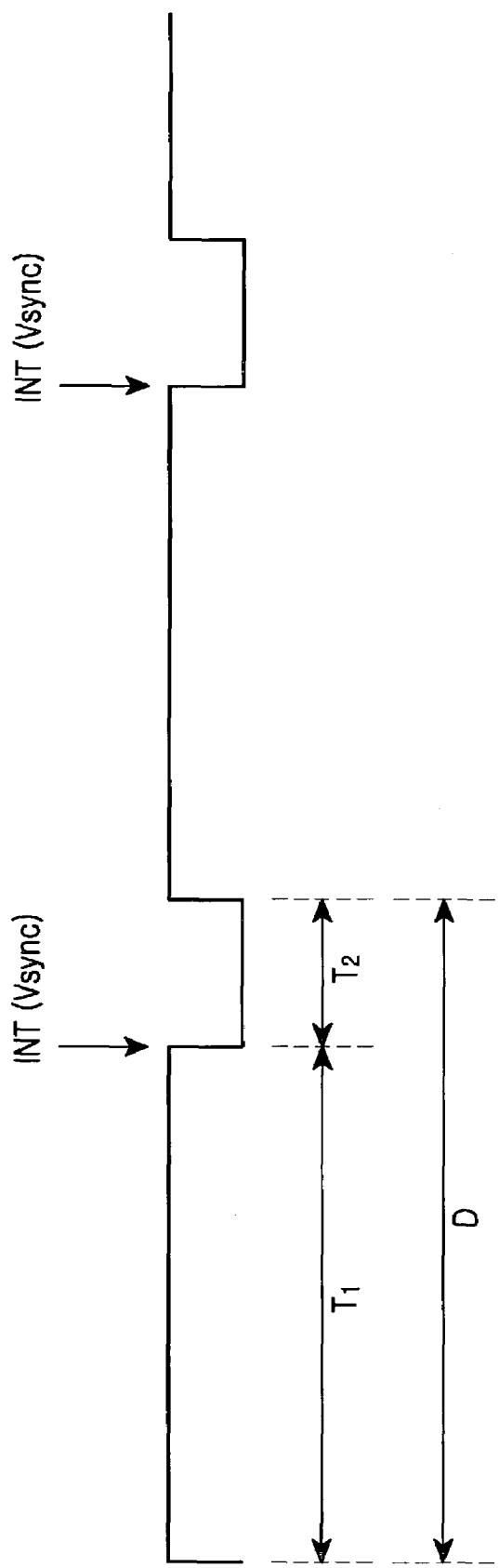
FIG. 3 is a timing diagram illustrating an operation of enabling a selector to select the display data in FIG. 2.

FIG. 3 shows a switching control signal of the switch controller 401.

Referring to FIG. 3, a time period (time) D is the time in which the vertical synchronous signal is generated. A time period (time) $T_1$ is the time in which the image data captured by the camera 20 is sent to the display unit 30. A time period (time) $T_2$ is the time in which the UI data generated in the mobile terminal 10 is sent to the display unit 30. If the vertical synchronous signal is generated, the switch controller 401 generates the switching control signal as shown in FIG. 3, thereby controlling the switch 403. In the time $T_1$ the switch 403 switches the output of the camera 20 to the display unit 30. Further, in the time $T_2$, the switch 403 switches the output of the mobile terminal 10 to the display unit 30. A falling edge signal contained in the switching control signal output from the switch controller 403 enables an interrupt signal to be applied to the mobile terminal 10. In response to the interrupt signal, a controller of the mobile terminal 10 outputs the UI data.

The switch controller 401 for generating the switching control signal shown in FIG. 3 includes a timer. In this case, when the vertical synchronous signal Vsync is generated, the timer is driven. A timer signal is generated so that the second logic state can be kept in the time $T_2$ as shown in FIG. 3. The device is designed so that a signal having the first logic state can be generated when a subsequent vertical synchronous signal Vsync is generated after the time $T_2$ is elapsed. Here, the vertical synchronous signal Vsync is generated after the image data of one frame is generated from the camera 20. The image data captured in the time $T_1$ is sent to the display unit 30 through the switch 403. Further, the time $T_2$ is set so that the UI data can be appropriately sent to the display unit 30. The switching control signal generated by the switch controller 401 enables one frame time to be divided into the times $T_1$ and $T_2$. Then, the image data generated from the camera 20 and the UI data generated from the controller of the mobile terminal 10 are sent to the display unit 30. In this case, the time $T_2$ can be optionally set according to need.

The switch 403 switches the output of the camera 20 to the display unit 30 in the time $T_1$ and switches the output of the mobile terminal 10 to the display unit 30, in the time period in which the vertical synchronous signal is generated. At this time, the UI data output from the mobile terminal 10 includes data indicating the operating state of the mobile terminal 10, displayed on the second display area 33 of the display unit 30, and menu information, associated with the image data, displayed on the third display area 35. The display unit 30 displays the image data output from the camera 20 on the first display unit 31. The display unit 30 displays corresponding UI data items on the second and third display areas 33 and 35.

In this embodiment of the present invention, the synchronous time interval of the display data is divided into the times $T_1$ and $T_2$. In the time $T_1$ the image data captured by the camera 20 is sent to the display unit 30. Further, in the time $T_2$, the UI data output from the controller of the mobile terminal 10 is sent to the display unit 30.

Figure 4:
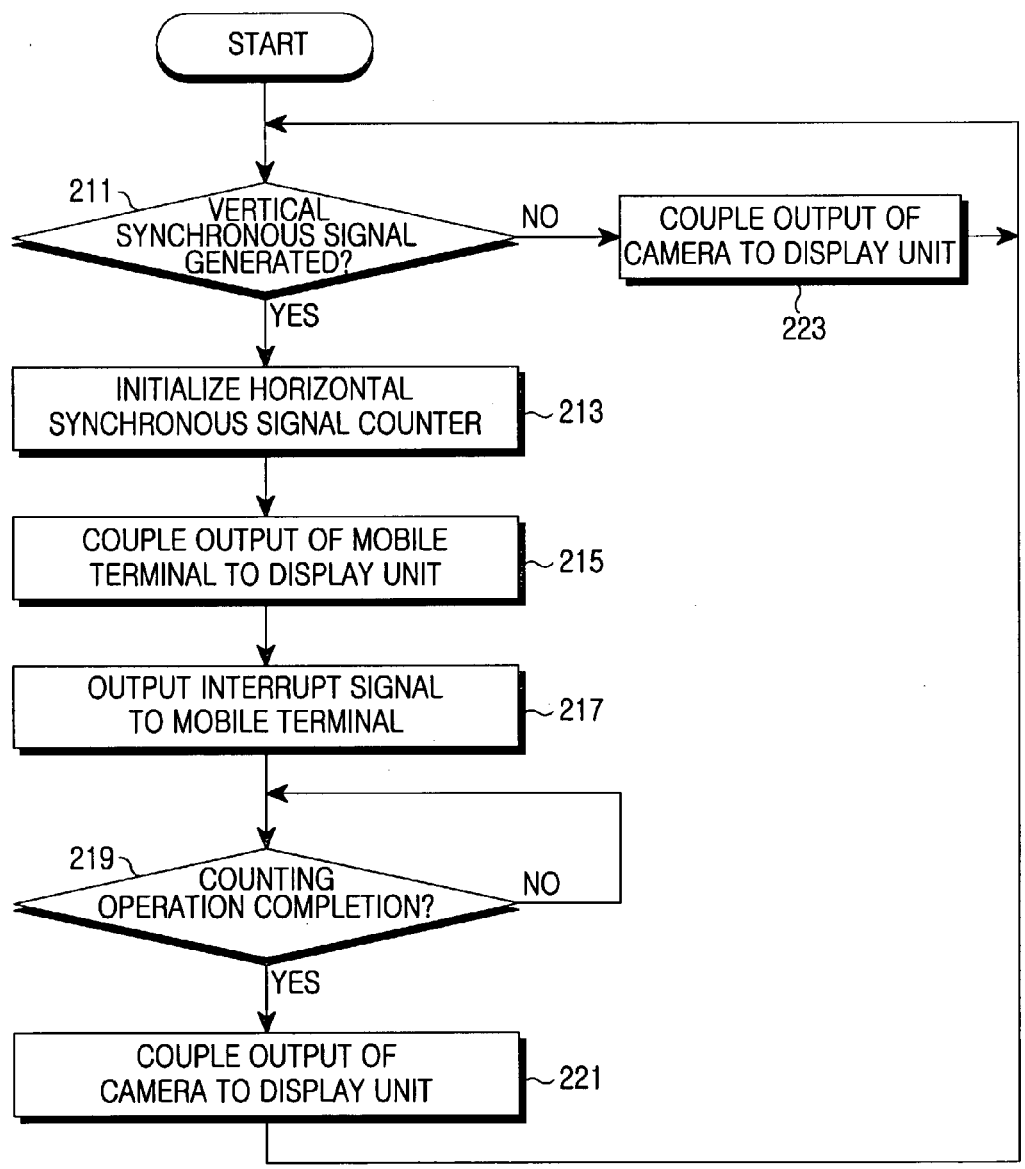
FIG. 4 is a flow chart illustrating a procedure of enabling the selector to select the display data in FIG. 2.

FIG. 4 is a flow chart illustrating a procedure of enabling the switch controller 401 to select the display data.

Referring to FIG. 4, the switch controller 401 determines whether a vertical synchronous signal has been generated at step 211. If the vertical synchronous signal has been generated ("Yes" path from decision step 211), the switch controller 401 initializes a horizontal synchronous signal counter at step 213. If, however, the vertical synchronous signal has not been generated ("No" path from decision step 211), the switch controller 401 couples the output of the camera to the display, as shown in step 223, and continues to monitor the status of the vertical synchronous signal. At step 215, the switch controller 401 controls the switch 403 so that the output of the mobile terminal 10 is coupled to the display unit 30. At this time, the counter must set count data needed for setting the second time $T_2$. The switch controller 401 enables the second time $T_2$ if the vertical synchronous signal is generated. At this time, the switch controller 401 generates the interrupt signal to the mobile terminal 10 at step 217. Thus, the mobile terminal 10 outputs user interface (UI) data in a corresponding frame time section. The switch 403 switches the UI data output from the mobile terminal 10 to the display unit 30. As a result, the second time $T_2$ is enabled, such that the display unit 30 displays items of the UI data on the second and third display areas 33 and 35.

As described above, the switch controller 401 decrements a count value of the counter if the second time $T_2$ is enabled. At this time, if the count value of the counter expires, the switch controller 401 senses the expiration of the count value at step 219 ("Yes" path from decision step 219). The switch controller 401 controls the switch 403 so that the switch 403 can select the output of the camera 20 at step 221. Thus, the switch controller 401 cuts off the output of the UI data from the mobile terminal 10 at the second time $T_2$, and couples the output of the camera 20 to the display unit 30. If, however, the count value of the counter has not expired, the switch controller continues to monitor the count value ("No" path from decision step 219). Thus, the display unit 30 displays the image data output from the camera 20 on the first display area 31. At this time, while the switch controller 401 performs steps 211 and 223, the switch controller 401 controls the switch 403 so that the output of the camera 20 can be sent to the display unit 30 until a subsequent vertical synchronous signal is generated.

In the first time $T_1$ set in a unit of a frame according to the vertical synchronous signal, the selector 40 selects the image data output from the camera 20 to output the selected image data to the display unit 30. Further, in the second time $T_2$, the selector 40 selects the UI data generated in the mobile terminal 10 to output the selected UT data to the display unit 30. In FIG. 4, it is assumed that the UI data is sent in the second time $T_2$ after the vertical synchronous signal is generated. However, after the vertical synchronous signal is generated, the image data output from the camera 20 can be optionally sent to the display unit 30 in the second time $T_2$, and the UI data generated in the mobile terminal 10 can be optionally sent to the display unit 30 in the first time $T_1$.

Figure 5:
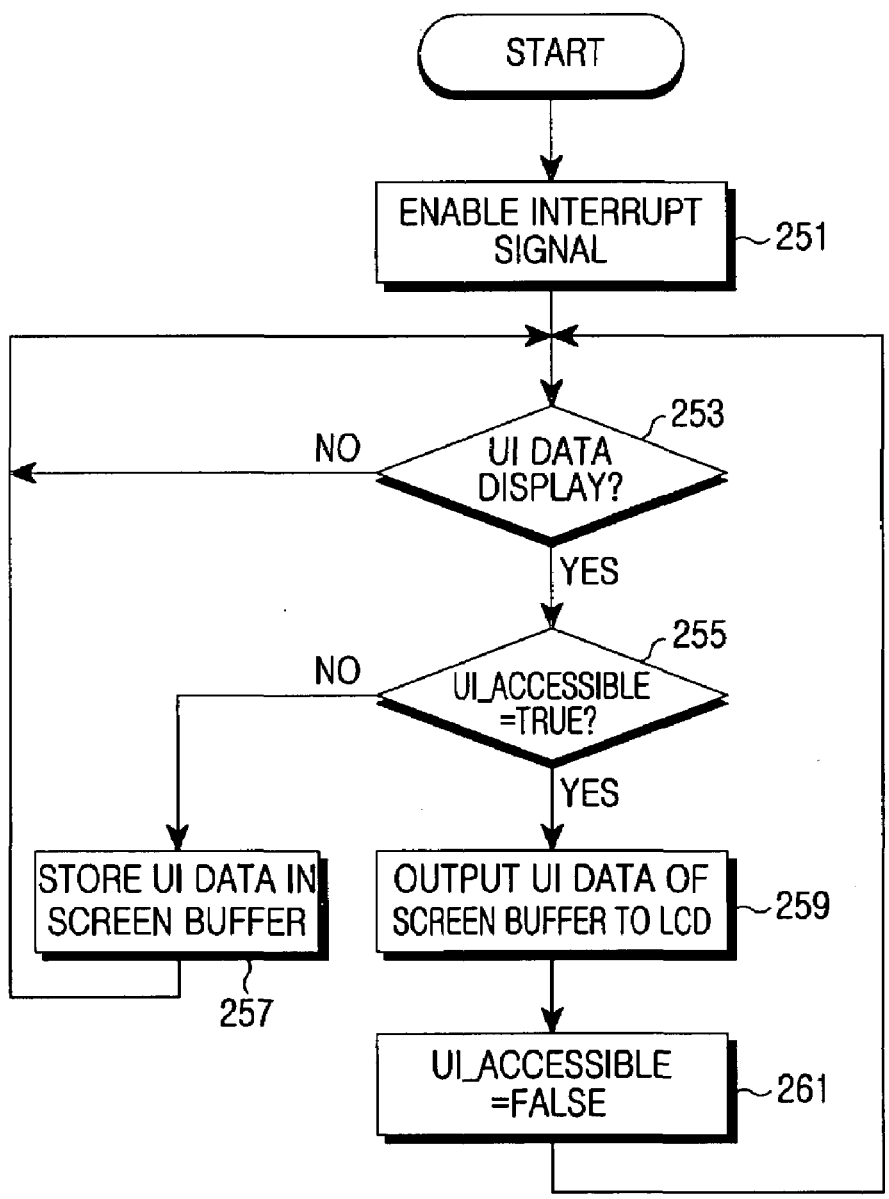
FIG. 5 is a flow chart illustrating a procedure of enabling the mobile terminal to output the display data in FIG. 2.

FIG. 5 is a flowchart illustrating a procedure of enabling the mobile terminal 10 to output the UI data. Referring to FIG. 5, the controller of the mobile terminal 10 enables an interrupt signal at step 251. At step 253, it is determined whether a central processing unit (CPU) attempts to send the UI data. If the CPU attempts to send the UT data ("Yes" path from decision step 253), it is determined, at step 255, whether the UI data must be actually output (UI_ACCESSIBLE=TRUE) ("Yes" path from decision step 255), or the UI data must be sent to a screen buffer (UI_ACCESSIBLE=FALSE) ("No" path from decision step 255). At this time, it is determined whether the UI data must be actually output using a flag UI_ACCESSIBLE. When the switch controller 401 generates the interrupt signal, the CPU recognizes the fact that the UI data can be displayed, and the flag UI_ACCESSIBLE is set to "TRUE". If the UI data is inaccessible (UI_ACCESSIBLE=FALSE) as a result of the determination at the above step 255, the UI data is stored in the screen buffer at step 257 ("No" path from decision step 255). On the other hand, if the UI data is accessible (UI_ACCESSIBLE=TRUE) as the result of the determination at the above step 255, the UI data of the screen buffer is output to the display unit 30 at step 259 ("Yes" path from decision step 255). After the flag UI_ACCESSIBLE is set to "FALSE" at step 261, the procedure returns to the above step 253. If the interrupt signal is generated, the controller of the mobile terminal 10 sets an operating state to a state where the UI data is accessible (UI_ACCESSIBLE=TRUE). Then, if the UI data is accessible, the mobile terminal 10 accesses the UI data stored in the screen buffer to output the accessed UI data. When the UI data is inaccessible, the variable UI_ACCESSIBLE is set equal to FALSE. If the UI data is inaccessible, the controller of the mobile terminal 10 stores new UI data to be displayed on the screen, in the screen buffer, so that the new UI data can be output in a subsequent frame time.

The controller of the mobile terminal 10 includes the screen buffer for storing the UI data. After a state transition occurs so that the screen buffer is accessible if the interrupt signal is generated, the UI data stored in the screen buffer is accessed and then the accessed UI data is output. After another state transition occurs so that the screen buffer is inaccessible, the UI data of a subsequent frame time is stored in the screen buffer.

Figure 6:
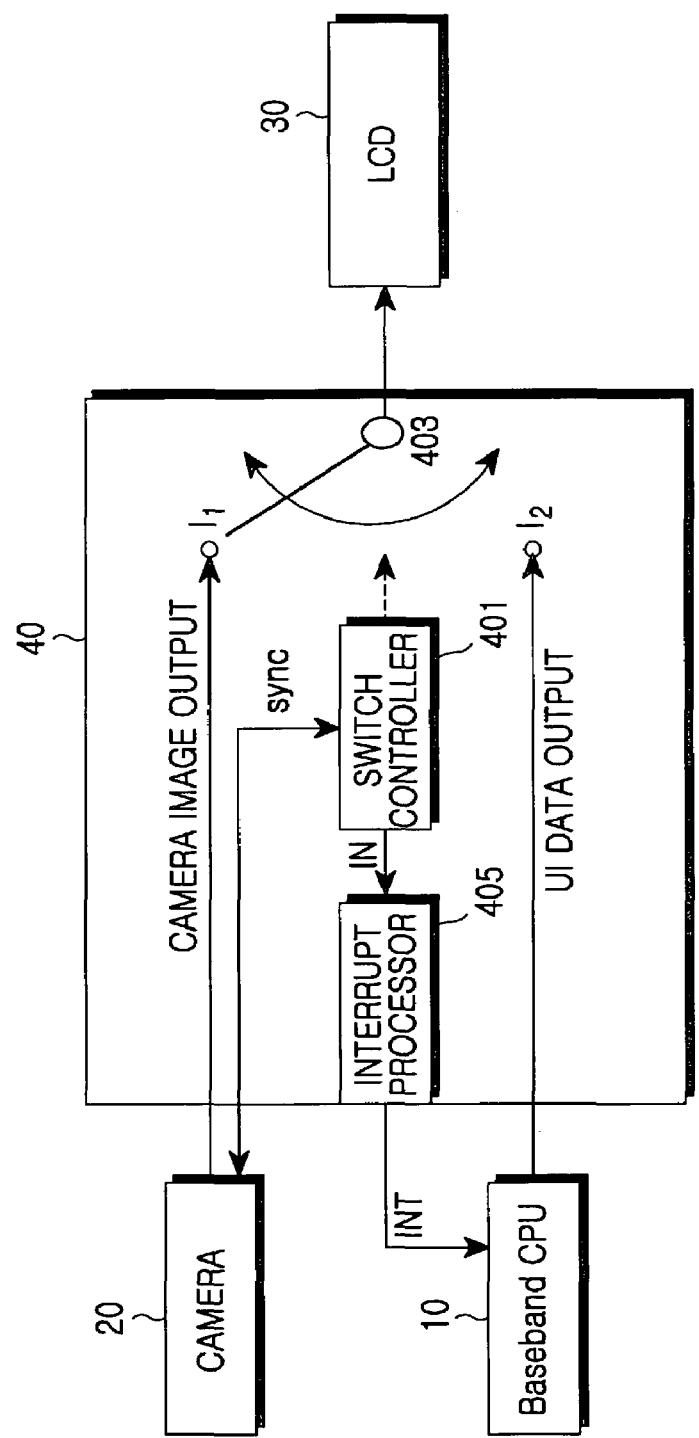
FIG. 6 is a view illustrating the configuration of a device for sending display data in a mobile terminal equipped with a camera in accordance with a second embodiment of the present invention.

FIG. 6 shows the configuration of a device for sending image data and user interface (UI) data to a display unit 30 provided in a mobile terminal 10 in accordance with the second embodiment of the present invention.

Referring to FIG. 6, the image data captured by the camera 20 and the UI data generated in the mobile terminal 10 are applied to the selector 40. As shown in FIG. 6, the selector 40 includes a switch controller 401, switch 403 and interrupt processor 405. The image data and UI data are output, to the display unit 30, in different time periods on the basis of a time division-based switching operation.

Operation of the selector 40 will now be described in accordance with the second embodiment of the present invention. First, the image data captured by the camera 20 and the UI data generated in the mobile terminal 10 is applied to the switch 403. The switch controller 401 controls the switch 403 in response to a synchronous signal output from the camera 20. The switch controller 401 enables the switch 403 to output, to the display unit 30, the image data captured by the camera 20 or the UI data generated in the mobile terminal 10.

After capturing image data, the camera 20 sends the captured image data to the display unit 30. In response to a vertical synchronous signal Vsync output from the camera 20, the switch controller 401 generates a switching control signal shown in FIG. 3. In response to the switching control signal, the switch 403 performs a switching operation. The switch 403 selectively outputs data applied to the first terminal $I_1$ and second terminal $I_2$ to the display unit 30.

Referring to FIG. 3, a time period (time) D is the time in which the vertical synchronous signal is generated. A time period (time) $T_1$ is the time in which the image data captured by the camera 20 is sent to the display unit 30. A time period (time) $T_2$ is the time in which the UI data generated in the mobile terminal 10 is sent to the display unit 30. If the vertical synchronous signal Vsync is generated, the switch controller 401 generates the switching control signal as shown in FIG. 3, thereby controlling the switch 403. Upon performing a switching operation in response to the switching control signal, the switch 403 couples, to the display unit 30, the output of the camera 20 input into the first terminal $I_1$ in the time $T_1$, and couples, to the display unit 30, the output of the mobile terminal 10 input into the second terminal $I_2$ in the time $T_2$.

When the vertical synchronous signal Vsync is generated as shown in FIG. 3, the switch controller 401 generates an interrupt signal and then outputs the generated interrupt signal to the interrupt processor 405. The controller of the mobile terminal 10 outputs the UI data to the second terminal $I_2$ of the switch 403. In accordance with the second embodiment of the present invention, the UI data is output only when the controller of the mobile terminal 10 updates the UI data. Otherwise, the UI data is not output. When the controller of the mobile terminal 10 transmitting the UI data does not update the UI data, the mobile terminal 10 operates in a sleep mode. When the controller of the mobile terminal 10 updates the UI data, the controller notifies the interrupt processor 405 of the UI data update . The case where the UI data is updated can be the case where the first UI data (e.g., information indicating a remaining amount of battery power, a current time, a reception sensitivity, and other related items.) is updated or the case where the second UI data (e.g., a menu for controlling a display picture) is updated. If the controller of the mobile terminal 10 notifies the interrupt processor 405 of the UI data update, the interrupt processor 405 operates in a bypass mode and then outputs the interrupt signal to the controller of the mobile terminal 10. If the controller of the mobile terminal 10 does not notify the interrupt processor 405 of the UI data update, the interrupt processor 405 operates in a process mode. At this time, the interrupt processor 405 does not apply the interrupt signal generated by the switch controller 401 to the controller of the mobile terminal 10.

When the UI data is sent to the display unit 30 in accordance with the second embodiment of the present invention, the interrupt processor 405 activates an operation of enabling the controller of the mobile terminal 10 to output updated UI data in a frame time when the UI data is updated in the controller of the mobile terminal 10. Moreover, the interrupt processor 405 inactivates the operation of enabling the controller of the mobile terminal 10 to output the UI data in the frame time where the UI data is not updated in the controller of the mobile terminal 10. Thus, the load of the controller of the mobile terminal 10 can be reduced.

The interrupt processor 405 can include a switch. In this case, the first output terminal of the interrupt processor 405 is connected to the controller of the mobile terminal 10, and the second output terminal of the interrupt processor 405 is connected to the switch controller 401. A UI data update notification signal output from the controller of the mobile terminal 10 can be used as the switching control signal. Further, when the UI data update notification signal is generated, it is switched to the first output terminal by the interrupt processor 405. Then, the interrupt signal output from the switch controller 401 is applied to the controller of the mobile terminal 10. Alternatively when the UI data update notification signal is not generated, the interrupt processor 401 selects the second output terminal. The interrupt signal is then output to the switch controller 401. In this situation, the switch controller 401 controls the switch 403 such that the switch 403 is not connected to the second terminal $I_2$. At this time, the switch 403 keeps a connection to the first terminal $I_1$. The switch controller 401 generates an appropriate switching control signal as shown in FIG. 3. At this time, if the display unit 30 does not receive data from the first terminal $I_1$ and second terminal $I_2$, the display unit 30 keeps currently displayed frame data. If the display unit 30 does not receive image data from the first terminal $I_1$ or does not receive UI data from the second terminal $I_2$, the image data and UI data associated with the currently displayed frame data are kept.

Figure 7:
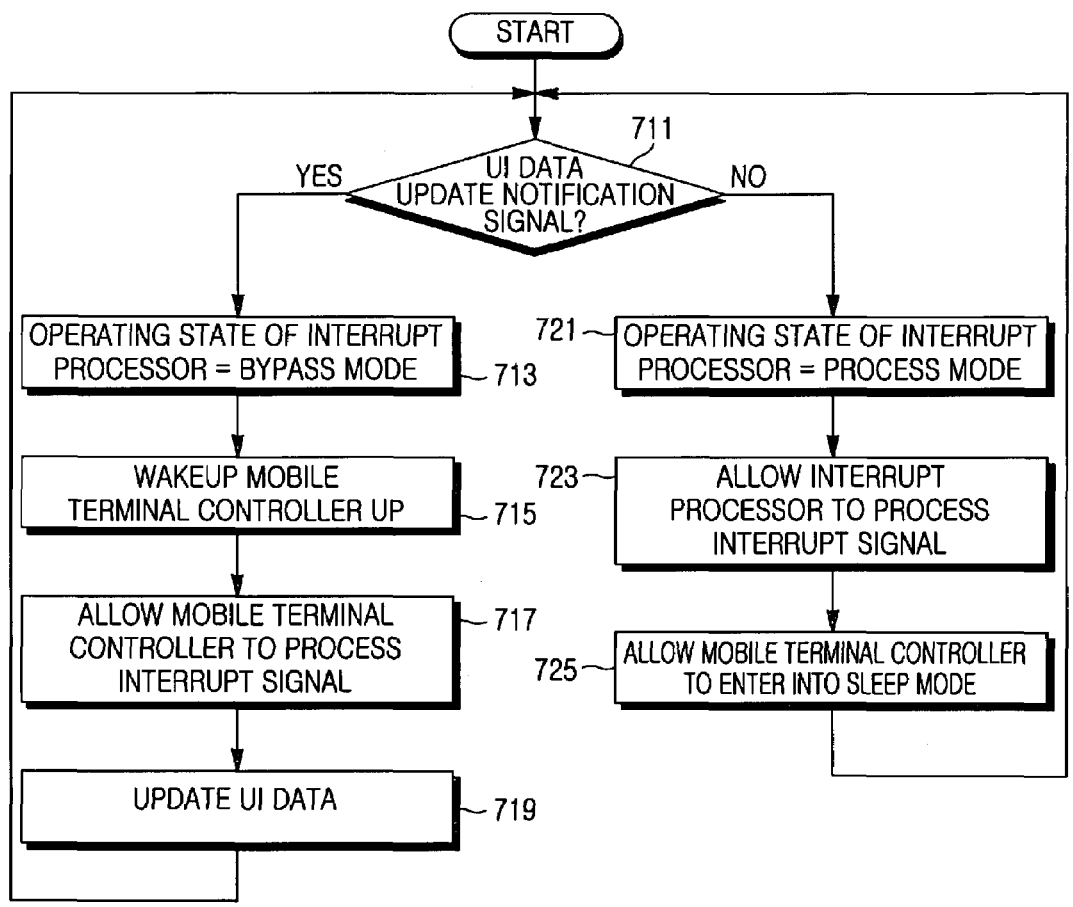
FIG. 7 is a flow chart illustrating a procedure of enabling the mobile terminal shown in FIG. 6 to output the display data.

FIG. 7 is a flow chart illustrating an operation of the interrupt processor 405.

In step 711 the interrupt processor 405 determines whether the UI data update notification signal has been generated from the controller of the mobile terminal 10. At this time, if the UI data update notification signal has been generated from the controller of the mobile terminal 10 ("Yes" path from decision step 711), the interrupt processor 405 performs steps 713 to 717. In steps 713 and 717, the operating mode of the interrupt processor 405 is set to the bypass mode (step 713). The controller of the mobile terminal 10 performs an operation for updating the UI data (step 715). A path is established so that the interrupt signal can be transferred to the controller of the mobile terminal 10 (step 717). Then, if the interrupt signal is generated, the interrupt processor 415 transfers the interrupt signal to the controller of the mobile terminal 10. In response to the interrupt signal, the controller of the mobile terminal 10 outputs the updated UI data to the second terminal $I_2$ (step 719). Thus, when the UI data associated with the controller of the mobile terminal 10 is updated, the updated UI data is output to the display unit 30 in the time $T_2$.

However, if the UI data update notification signal has not been generated ("No" path from decision step 711) interrupt processor 405 performs steps 721 to 723. In step 721 the operating mode of the interrupt processor 415 is set to the process mode such that the interrupt signal is not transferred to the controller of the mobile terminal 10. Thus, although the interrupt signal is generated, the interrupt processor 415 does not apply the interrupt signal to the controller of the mobile terminal 10 (the interrupt processor processes the interrupt signal 723) and the operating mode of the controller of the mobile terminal 10 is set to a sleep mode (step 725).

Figure 8:
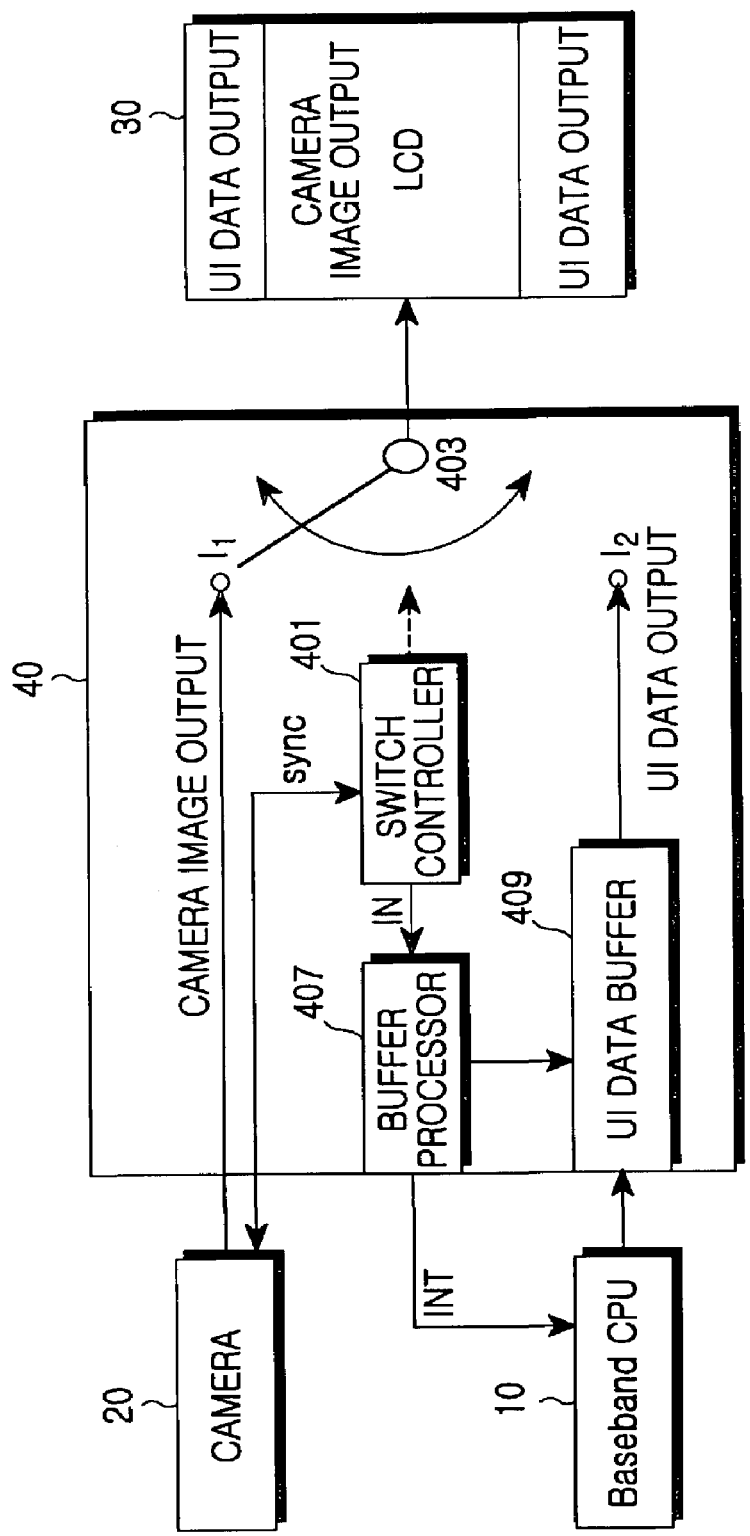
FIG. 8 is a view illustrating the configuration of a device for sending display data in a mobile terminal equipped with a camera in accordance with a third embodiment of the present invention.

FIG. 8 is a view illustrating the configuration of a device for sending image data and user interface (UI) data to a display unit 30 provided in a mobile terminal 10 in accordance with the third embodiment of the present invention.

Referring to FIG. 8, the image data captured by a camera 20 and the UI data generated in the mobile terminal 10 are applied to a selector 40. As shown in FIG. 8, the selector 40 includes a switch controller 401, switch 403, buffer processor 407 and UI data buffer 409. The image data and UI data are output, to the display unit 30, in different time periods on the basis of a time division-based switching operation.

Operation of the selector 40 will be described in accordance with the third embodiment of the present invention. First, the image data captured by the camera 20 and the UI data generated from the mobile terminal 10 is applied to the switch 403. The switch controller 401 controls the switch 403 in response to a synchronous signal output from the camera 20. The switch controller 401 enables the switch 403 to send the image data captured by the camera 20 or the UI data generated in the mobile terminal 10, to the display unit 30.

After capturing image data, the camera 20 sends the captured image data to the display unit 30. In response to a vertical synchronous signal Vsync output from the camera 20, the switch controller 401 generates a switching control signal shown in FIG. 3. In response to the switching control signal, the switch 403 performs a switching operation. The switch 403 switches data applied to the first terminal $I_1$ and second terminal $I_2$, to the display unit 30

Referring to FIG. 3, a time period (time) D is the time in which the vertical synchronous signal is generated. A time period (time) $T_1$ is the time in which the image data captured by the camera 20 is sent to the display unit 30. A time period (time) $T_2$ is the time in which the UI data generated in the mobile terminal 10 is sent to the display unit 30. If the vertical synchronous signal Vsync is generated, the switch controller 401 generates the switching control signal as shown in FIG. 3, thereby controlling the switch 403. Upon performing a switching operation in response to the switching control signal, the switch 403 couples the output of the camera 20 input into the first terminal in the time $T_1$, and the output of the mobile terminal 10 input into the second terminal, to the display unit 30, in the time $T_2$.

Further, when the vertical synchronous signal Vsync is generated as shown in FIG. 3, the switch controller 401 generates an interrupt signal and then outputs the generated interrupt signal to the buffer processor 407. The controller of the mobile terminal 10 stores the UI data in the UI data buffer 409. The buffer processor 407 reads the UI data stored in the UI data buffer 409 and then outputs the read UI data to the second terminal $I_2$. In accordance with the third embodiment of the present invention, the controller of the mobile terminal 10 stores the updated UI data in the UI data buffer 409 if the UI data is updated. Otherwise, the controller of the mobile terminal 10 does not perform the storing operation. Thus, it can be understood that the updated UI data is stored in the UI data buffer 409. The UI data buffer 409 can use a dual port memory. Further, the UI data buffer 409 is divided into storage areas for storing the first UI data (e.g., information indicating a remaining amount of battery power, a current time, a reception sensitivity, and other related items) or the second UI data (e.g., a menu for controlling a display picture).

When the switch controller 401 generates the interrupt signal, the buffer processor 407 is driven to access the UI data stored in the UI data buffer 409 and output the accessed UI data to the second terminal $I_2$. The buffer processor 407 can include a counter. If the interrupt signal is generated from the switch controller 401, the operating mode of the counter is set to a counting enable mode. A counting operation is initiated in the counting enable mode. Each of count values generated as a result of the counting operation is applied as an address signal for accessing the UI data buffer 409. The count values must be available to address all storage areas storing the first and second UI data of the UI data buffer 409. It is preferable that the counter is designed so that the counting operation can be completed within the time $T_2$.

Thus, if the switch controller 401 generates the switching control signal as shown in FIG. 3, the switch 403 switches image data output from the camera 20 in the time $T_1$ to the display unit 30. As a result, the display unit 30 displays the received image data on the display area 31 (shown in FIG. 1). If the first UI data or second UI data is generated, the controller of the mobile terminal 10 sets the operating mode to a write mode for writing the first or second UI data to the UI data buffer 409. The controller of the mobile terminal 10 stores the updated UI data in a corresponding area of the UI data buffer 409. If a vertical synchronous signal Vsync is generated after the camera 20 outputs image data of one frame, the switch controller 401 generates the switching control signal as shown in FIG. 3. As a result, the address signal is generated after the buffer processor 407 operates and the operating mode is set to a read mode for reading the UI data buffer 409. Then, the buffer processor 407 accesses UI data contained in a corresponding area of the UI data buffer 409 according to the generated address signal so that the accessed UI data can be output. The switch 403 then outputs the UI data output from the UI data buffer 409 to the display unit 30. The display unit 30 then displays the first and second UI data on the display areas 33 and 35.

Figure 9:
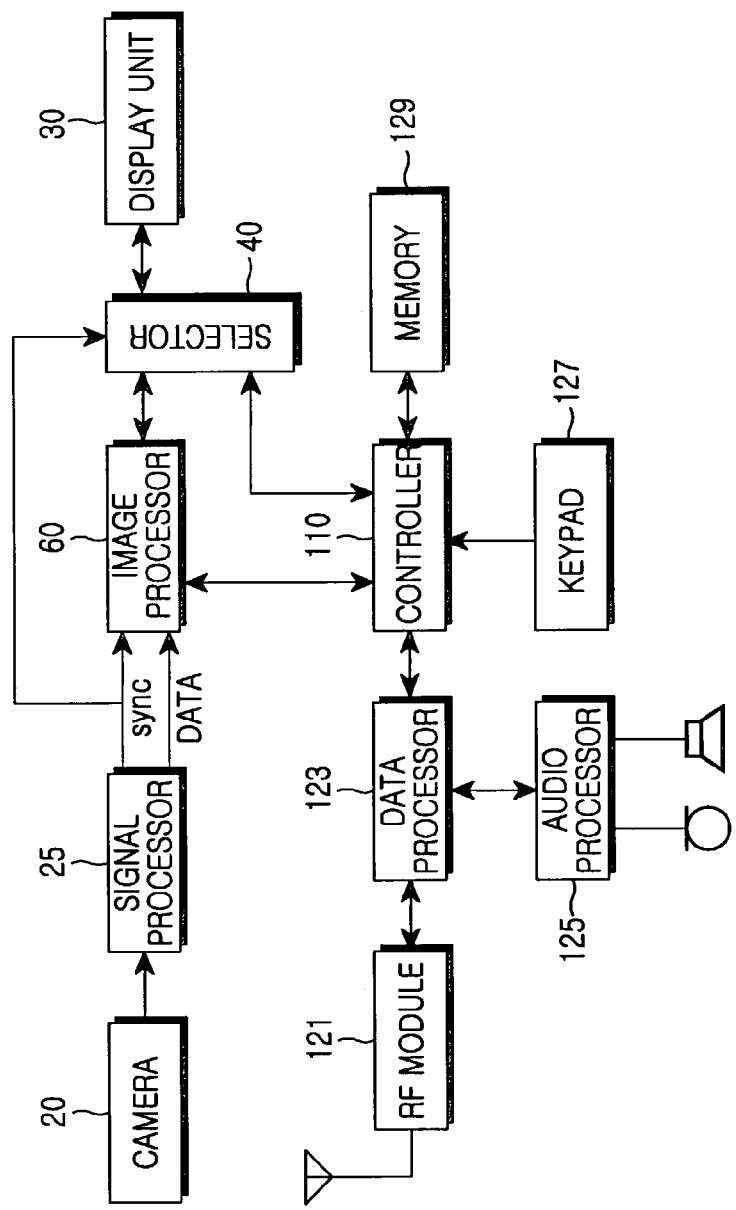
FIG. 9 is a view illustrating the configuration of a mobile terminal equipped with a camera in accordance with an embodiment of the present invention.

FIG. 9 is a view illustrating the configuration of a device for processing an image in accordance with various embodiments of the present invention. The device can be a mobile terminal.

Referring to FIG. 9, a radio frequency (RF) module 121 performs communications of the mobile terminal. The RF module 121 includes an RF transmitter for up-converting and amplifying a frequency of a signal to be transmitted, and an RF receiver for carrying out a low noise amplification for a received signal and down-converting a frequency of the amplified received signal, among other related operations. A data processor 123 includes a transmitter for encoding and modulating the transmission signal, and a receiver for demodulating and decoding the received signal, among other related operations. The data processor 123 can be configured by a modem and a codec. An audio processor 125 reproduces an audio signal received from the data processor 123 or outputs an audio signal from a microphone to the data processor 123.

A keypad 127 includes keys for inputting numeric and character information and function keys for setting various functions. The keypad 127 can include a mode setting key and image capture key for performing image capture and display functions so that the image data captured by the camera 20 can be displayed. A memory 129 is configured by a program memory and a data memory. The program memory can store a program for controlling the general operation of the mobile terminal and can also store a program for controlling the path of the image data applied to the display unit 30 in accordance with the various embodiments of the present invention. The data memory temporarily stores data generated while the programs are executed. The memory 129 can include a screen buffer for storing the UI data.

A controller 110 controls the entire operation of the mobile terminal. Optionally, the controller 10 can include the data processor 123. In accordance with the present invention, the controller 110 controls the procedure shown and described in reference to FIG. 5 such that the UI data items can be displayed on the second display area 33 and the third display area 35. Further, the controller 110 controls a signal processor 25 when changing a mode setting in response to an input of a mode setting key from the keypad 127. The mode setting change can include changing the operating mode to the image capture mode. The controller 110 performs a control operation such that the image data can be captured and displayed according to the image capture mode.

The camera 20 for capturing an image includes a camera sensor for converting an optical signal of the captured image into an electric signal. Here, it is assumed that the camera sensor is a charge coupled device (CCD) image sensor, though other types of image sensors can be used, as one skilled in the art can appreciate and understand. The signal processor 25 converts image signals output from the camera 20 into digital image data. Here, the signal processor 25 can be implemented by a digital signal processor (DSP), though other implementations are possible. For example, another implementation that can perform digital signal processing is a circuit comprised of various integrated circuit devices, a circuit comprised of discrete components, or a processor similar to data processor 112 with a specific set of software written for digital signal processing. An image processor 60 performs a function of generating screen data from the image data output by the signal processor 25. The image processor 60 scales the image data output from the signal processor 25 on the basis of one or more specifications of the display unit 30, and then outputs the scaled image data. Moreover, the image processor 70 compresses and decompresses the image data corresponding to image signals captured by the camera 20.

The selector 40 receives the image data from the image processor 60 and the UI data from the controller 110, and then outputs the image data and UI data to the display unit 30 in response to a synchronous signal output from the camera 20. Here, the synchronous signal can be a vertical synchronous signal (being a frame synchronous signal). The selector 40 can have the configuration shown in FIG. 2. As shown in FIG. 3, the image data from the camera 20 is selectively output in the first time $T_1$ set in a unit of a frame, and the UI data from the controller 110 is selectively output in the second time $T_2$.

The display unit 30 is divided into the first display area 31 for displaying the image data output from the camera 20, and the second and third display areas 33 and 35 for displaying the first and second UI data items output from the controller 110. Thus, the display unit 30 displays the image data output from the image processor 40 on the first display area 31, and displays the UI data items output from the controller 110 on the second and third display areas 33 and 35. The display unit 30 can use a liquid crystal display (LCD), though other types of displays can also be used, as one skilled in the art can appreciate and understand. In this case, the display unit 30 can include an LCD controller, a memory capable of storing the image data and LCD elements. If the LCD is implemented in the form of a touch screen, a group comprising the keypad 27 and LCD (display unit 30) can be a key input unit group.

Operation of the mobile terminal will be described with reference to FIG. 9. If a user performs a dialing operation through the keypad 127 at the time of transmitting a call signal, and sets a call signal transmitting mode, the controller 110 senses the set call signal transmitting mode, processes dialing information received from the data processor 123, converts the dialing information into an RF signal through the RF module 121, and outputs the RF signal. Then, if a called party generates a response signal, the controller 110 senses the response signal from the called party through the RF module 121 and the data processor 123. A voice communication path is then established through the audio processor 125, such that the user can communicate with the called party. In a call signal receiving mode, the controller 110 senses the call signal receiving mode through the data processor 123, and generates a ring signal through the audio processor 125. If the user gives a response to the ring signal, the controller 110 senses the response to the ring signal. Thus, the voice communication path is established through the audio processor 125, such that the user can communicate with a calling party. The voice communication in the call signal transmitting and receiving modes has been described as an example. The mobile terminal can perform a data communication function for packet data and image data communications as well as the voice communication. Moreover, when the mobile terminal is in a standby mode or performs character communication, the controller 10 controls the display unit 30 such that the display unit 30 displays character data processed by the data processor 123.

The mobile terminal can also capture an image of a person or peripheral environment, and display or transmit the image. The camera 20 is mounted in the mobile terminal (internal camera) or connected to the mobile terminal at its predetermined external position (external camera). The camera 20 can use a charge coupled device (CCD) image sensor or a complementary metal oxide semiconductor (CMOS) image sensor, as well as other image capturing sensors, as one skilled in the art can appreciate and understand. After an image signal captured by the camera 20 is converted into an analog electric signal, the analog electric signal is applied to the signal processor 25. Then, the signal processor 25 then converts the analog image signal into digital image data, and then outputs the digital image data to the image processor 60.

The image processor 60 scales the received image data on the basis of the size of the first display area 31 of the display unit 30 and outputs the scaled image data. Further, if a still-picture capture command is generated, the image processor 60 compresses the image data to output the compressed image data to the controller 110.

Further, the selector 40 selects an output of the image processor 60 or controller 110 in response to the vertical synchronous signal (being the frame synchronous signal) and then outputs the selected output to the display unit 30.

Figure 10:
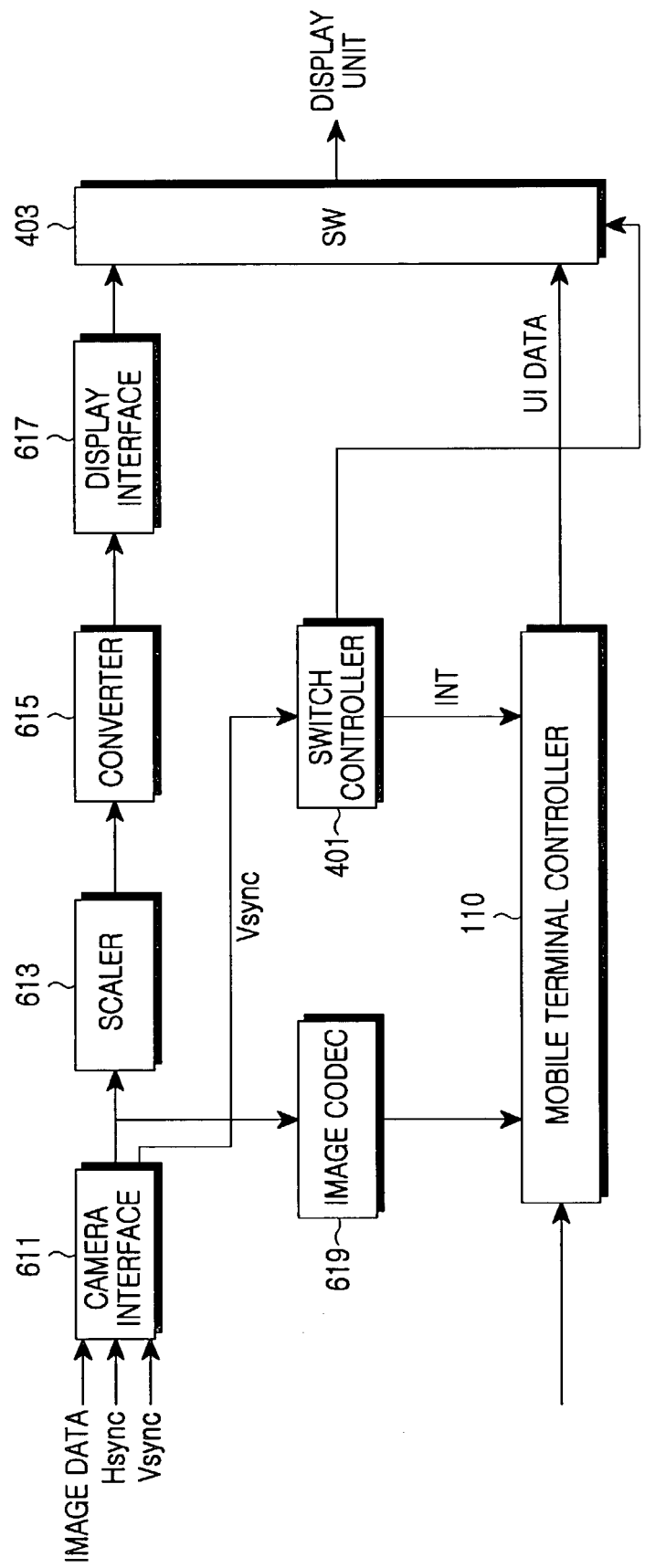
FIG. 10 is a view illustrating the detailed configuration of a device for selecting display data associated with the camera and mobile terminal shown in FIG. 9 in accordance with the first embodiment of the present invention.

FIG. 10 is a view illustrating an example of components included in the selector 40 for sending display data output from the image processor 60 and controller 110 to the display unit 30 in accordance with the first embodiment of the present invention.

The image processor 60 performs the function of an interface for image data between the signal processor 25 and the display unit 30, and compresses and decompresses data of image signals received from the camera 20 in a joint photographic experts group (JPEG) format. The image processor 60 can further include the function of generating a thumbnail picture or editing an image screen to be displayed.

Referring to FIG. 10, a camera interface (hereinafter, referred to as a CCD interface) 611 performs an interface for image data (based on a YUV format) and synchronous signals Hsync and Vsync from the signal processor 25. Here, the Hsync is used as a horizontal valid time flag and a line synchronous signal. The Hsync can be a horizontal synchronous signal. Further, the Vsync is used as a vertical valid time flag generated in a unit of a frame and a frame synchronous signal. The Vsync can be a vertical synchronous signal. The scaler 613 scales the image data on the basis of a size of the first display area of the display unit 30 to output the scaled image data. A converter 615 converts the YUV format-based image data into RGB format-based image data. A display interface 617 performs an interface with the display unit 30, and can include a buffer for storing image data having a size of a frame. An image codec 619 compresses image data output from the signal processor 25 in the JPEG format to output code data to the controller 110 or decompresses code data received from the controller in the JPEG format.

Here, it is assumed that the image data from the camera 20 corresponds to a CIF size of 352×288, and a size of the first display area 31 of the display unit 30 corresponds to a size of 128×112 or 128×96.

Operation of the image processor 60 will now be described. The CCD interface 611 performs the function of an interface for the image data output by the signal processor 25. Here, the image data is based on a YUV format and fixed to a CIF of 352×288 pixels. In accordance with an embodiment of the present invention, the scaler 613 scales data of the image signals captured by the camera 20 in response to a control signal received from the controller 110, such that the scaled image data is displayed on the display unit 30. The number of pixels of the image signals received from the camera 20 corresponds to the CIF size of 352×288, and the number of pixels of image signals capable of being displayed on the display unit 30 corresponds to a size of 128×112 or 128×96. Thus, the scaler 613 reduces and crops the pixels of the image signals received from the camera 20 to create the number of the image signal pixels capable of being displayed on the display unit 30. Moreover, the scaler 613 can enlarge the pixels of the image signals received from the camera 20 such that the enlarged pixels can be displayed. In a method for enlarging and displaying the pixels, the pixels of the image signals received from the camera 20 are selected by the number of pixels capable of being displayed on the display unit 30 and the selected image signal pixels can be displayed. The converter 615 converts YUV data received from the scaler 613 into RGB data and then outputs the RGB data. The LCD interface 617 performs a function of an interface for the image data of the display unit 30. A frame buffer performs the function of buffering the image data interfaced between the LCD interface 617 and the display unit 30.

Operation of transmitting image data from the image processor 60 and UI data from the controller 110 will now be described.

If a vertical synchronous signal is generated, the switch controller 40 performs the procedure shown in FIG. 4 and generates the switching control signal shown in FIG. 3. The switch controller 401 controls the switch 403 in the first time $T_1$ of the frame period such that the output of the display interface 617 can be selected. Further, under the control of the switch controller 403, the display interface 617 accesses image data stored in the frame buffer to output the accessed image data to the switch 403 in the first time $T_1$. The display unit 30 displays the image data output from the display interface 617 on the first display area 31. In the second time $T_2$, the switch controller 401 outputs the interrupt signal to the controller 110. In this situation, the controller 110 performs the procedure shown in FIG. 5 and accesses the UI data stored in the screen buffer to output the accessed UI data. This case corresponds to a state where the switch controller 401 controls the switch 403 such that the output of the controller 110 is selected. Thus, the switch 403 outputs the first and second UI data from the controller 110 to the display unit 30. In this situation, the display unit 30 displays the first UT data on the second display area 33 and displays the second UI data on the third display area 35.

Figure 11:
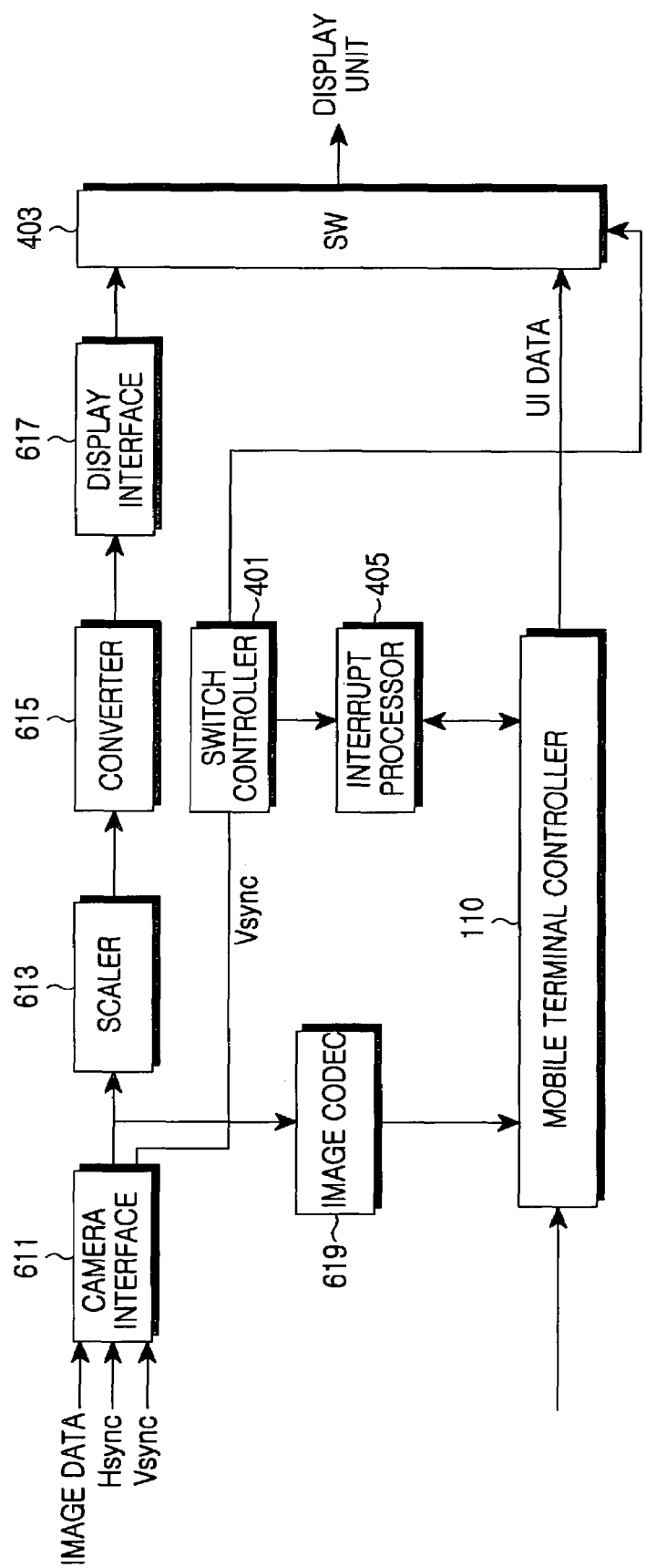
FIG. 11 is a view illustrating the detailed configuration of a device for selecting display data associated with the camera and mobile terminal shown in FIG. 9 in accordance with the second embodiment of the present invention.

FIG. 11 is a view illustrating another example of components included in the selector 40 for selecting display data associated with the camera and mobile terminal shown in FIG. 9 in accordance with the second embodiment of the present invention.

Components of the selector 40 shown in FIG. 11 are configured as shown in FIG. 6. The operations of other components except for the components of the selector 40 shown in FIG. 11 are the same as those of components shown in FIG. 10.

Figure 12:
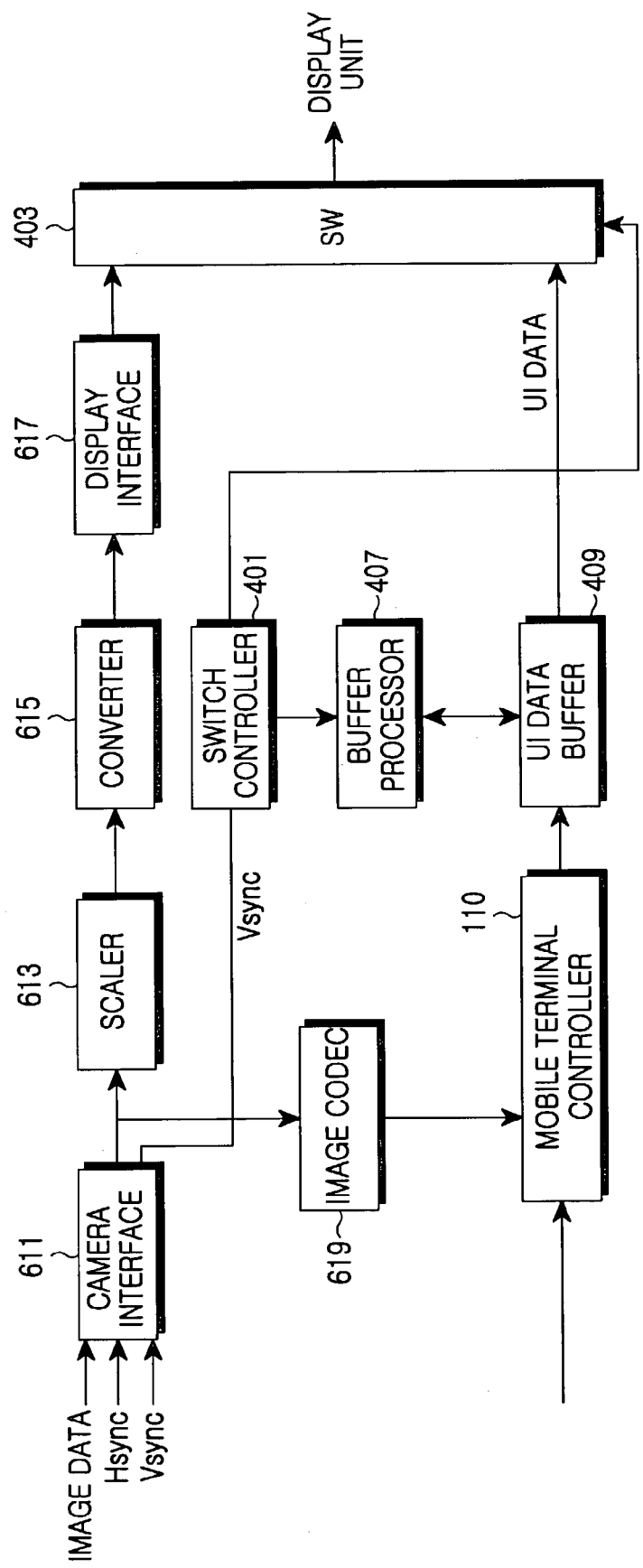
FIG. 12 is a view illustrating the detailed configuration of a device for selecting display data associated with the camera and mobile terminal shown in FIG. 9 in accordance with the third embodiment of the present invention.

FIG. 12 is a view illustrating a further example of components included in the selector 40 for selecting display data associated with the camera and mobile terminal shown in FIG. 9 in accordance with the third embodiment of the present invention.

Components of the selector 40 shown in FIG. 12 are configured as shown in FIG. 8. The operations of other components except for the components of the selector 40 shown in FIG. 12 are the same as those of components shown in FIG. 10.

In a mobile terminal equipped with a camera, image data captured by the camera and user interface (UT) data generated in the mobile terminal are sent to a display unit in set time sections, such that the UT data and image data can be efficiently displayed in the mobile terminal.

Although certain embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments, but are defined by the claims which follow, along with their full scope of equivalents.

What is claimed is:

1. A device for displaying data in a mobile terminal, comprising:
    a camera for outputting captured image data to be displayed and a synchronous signal;
    a mobile terminal controller for outputting updated user interface (UI) data when an interrupt signal is generated, and keeping currently displayed UI data when the interrupt signal is not generated; an interrupt processor for applying the interrupt signal to the mobile terminal controller in a process mode, and not applying the interrupt signal to the mobile terminal controller in a bypass mode;
    a selector responsive to the synchronous signal from the camera for dividing a frame data time into a first time and a second time, selecting and outputting the image data in the first time, and selecting and outputting the UI data in the second time; and
    a display unit for displaying the image data and UI data output from the selector on corresponding display areas.

2. The device as set forth in claim 1, wherein the synchronous signal is a vertical synchronous signal.

3. The device as set forth in claim 2, wherein the selector comprises:
    a switch controller for dividing the frame data time when the vertical synchronous signal is generated, generating a first time signal to output the image data, generating a second time signal to output the UI data, and generating an interrupt signal to enable the UI data to be output when the second time signal is generated; and a switch for switching, to the display unit, an output of the camera in the first time and switching, to the display unit, an output of the mobile terminal in the second time.

4. The device as set forth in claim 3, wherein the UI data comprises:
   a first UI data indicating an operating state of the mobile terminal; and
   a second UI data indicating a display menu associated with the image data.

5. The device as set forth in claim 4, wherein the display unit comprises:
   a first display area for displaying the image data;
   a second display area arranged at an upper portion of the first display area for displaying the first UI data; and
   a third display area arranged at a lower portion of the first display area for displaying the second UI data.

6. A method for displaying data in a mobile terminal equipped with a camera for outputting captured image data to be displayed and a synchronous signal, the mobile terminal generating user interface (UI) data, comprising the steps of:
   outputting updated user interface (UI) data when an interrupt signal is generated, and keeping currently displayed UI data when the interrupt signal is not generated, wherein the interrupt signal is generated in a process mode and the interrupt signal is not generated in a bypass mode
   dividing a frame data time into a first time and a second time and generating a first time signal and a second time signal when the synchronous signal is output;
   selecting and displaying the image data output from the camera on a display area of the display unit when the first time signal is generated; and
   selecting and displaying the UI data generated in the mobile terminal on another display area of the display unit when the second time signal is generated.

7. The method as set forth in claim 6, wherein the synchronous signal is a vertical synchronous signal.

8. The method as set forth in claim 7, wherein the UI data comprises:
   a first UI data indicating an operating state of the mobile terminal; and
   a second UI data indicating a display menu associated with the image data.

9. A device for displaying data in a mobile terminal, comprising:
   a camera for outputting captured image data to be displayed and a synchronous signal;
   a mobile terminal controller for outputting an update notification signal when user interface (UI) data is updated, outputting the updated UI data when an interrupt signal is generated, and keeping currently displayed UI data when the interrupt signal is not generated;
   a switch controller responsive to a synchronous signal from the camera for dividing a frame data time into a first time and a second time and generating a control signal to select the image data in the first time and select the UI data in the second time;
   an interrupt processor for applying the interrupt signal to the mobile terminal controller in a process mode when the UI data is updated in the mobile terminal and a second time control signal is generated, and not applying the interrupt signal to the mobile terminal controller in a bypass mode when the UI data is not updated in the mobile terminal;
   a switch for switching an output of the camera when the switch controller generates a first time control signal, and selecting an output of the mobile terminal when the second time control signal is generated in the switch controller; and
   a display unit for displaying the image data and UI data output from the switch on corresponding display areas.

10. The device as set forth in claim 9, wherein the synchronous signal is a vertical synchronous signal.

11. The device as set forth in claim 10, wherein the UI data comprises:
    a first UI data indicating an operating state of the mobile terminal; and
    a second UI data indicating a display menu associated with the image data.

12. The device as set forth in claim 11, wherein the display unit comprises:
    a first display area for displaying the image data;
    a second display area arranged at an upper portion of the first display area for displaying the first UI data; and
    a third display area arranged at a lower portion of the first display area for displaying the second UI data.

13. A device for displaying data in a mobile terminal, comprising:
    a camera for outputting captured image data to be displayed and a synchronous signal;
    a mobile terminal controller for outputting user interface (UI) data to a buffer when user interface (UI) data is updated, and maintaining a previous UI data when UI data is not updated;
    the buffer for storing the UI data output from the mobile terminal controller;
    a switch controller responsive to a synchronous signal from the camera for dividing a frame data time into a first time and a second time and generating a control signal to select the image data in the first time and select the UI data in the second time;
    a buffer processor for outputting the UI data stored in the buffer when a second time control signal is generated in the switch controller;
    a switch for switching an output of the camera when the switch controller generates a first time control signal, and selecting an output of the mobile terminal when the second time control signal is generated in the switch controller; and
    a display unit for displaying the image data and UI data output from the switch on corresponding display areas.

14. The device as set forth in claim 13, wherein the synchronous signal is a vertical synchronous signal.

15. The device as set forth in claim 14, wherein the UI data comprises:
    a first UI data indicating an operating state of the mobile terminal; and
    a second UI data indicating a display menu associated with the image data.

16. The device as set forth in claim 15, wherein the display unit comprises:
    a first display area for displaying the image data;
    a second display area arranged at an upper portion of the first display area for displaying the first UI data; and
    a third display area arranged at a lower portion of the first display area for displaying the second UI data.

* * * * *